United States Patent [19]
Borgstrom

[11] 3,846,803
[45] Nov. 5, 1974

[54] DISTANCE MEASURING INSTRUMENT FOR MOTOR VEHICLES

[75] Inventor: Lennart Borgstrom, Svangsta, Sweden

[73] Assignee: Recard Taxameter AB, Halmstad, Sweden

[22] Filed: June 21, 1973

[21] Appl. No.: 372,493

[30] Foreign Application Priority Data
June 28, 1972 Sweden............................... 8507/72
June 28, 1972 Sweden............................... 8508/72

[52] U.S. Cl................................... 346/95, 346/104
[51] Int. Cl.......................................... G01c 22/00
[58] Field of Search........... 346/95, 89, 104, 94, 61, 346/60, 33 D, 141

[56] References Cited
UNITED STATES PATENTS
| 946,755 | 1/1910 | Golden | 346/95 |
| 1,292,135 | 1/1919 | Straub | 346/89 |
| 2,160,032 | 5/1939 | Ohmer | 346/61 X |

Primary Examiner—Joseph W. Hartary
Attorney, Agent, or Firm—Holman & Stern

[57] ABSTRACT

A distance measuring instrument for motor vehicles by which the distance covered is printed by symbols on a card insertable into a slit in the instrument casing, in which there is provided an accummulating counting mechanism which, by a mechanism, can be actuated to move from the non-operative position to an operative position adjacent the slit for stamping the card via ink to mark the accummulated value on the card, and in which the card slit is provided with a curtain which, in the non-operative position, covers an opening through which the stamping mechanism acts during stamping, with the curtain being connected to the stamping mechanism so that it exposes the opening immediately prior to the stamping and returns to the position covering the opening immediately after stamping.

8 Claims, 7 Drawing Figures

DISTANCE MEASURING INSTRUMENT FOR MOTOR VEHICLES

BACKGROUND OF THE INVENTION

This invention relates to a distance measuring instrument for motor vehicles by which the distance covered is printed by symbols, preferably figures, on a card insertible into a slit formed in the casing of the instrument, which instrument comprises an accumulating counting mechanism, which, via a mechanism, can be actuated so as to move from a protected non-operative position concealed in the casing to an operative position adjacent the slit for stamping said card, in such a manner, that the counting mechanism by ink or the like marks the accumulated value on the card, and the mechanism for moving the counting mechanism from its nonoperative position to its operative position comprises a counting mechanism frame, which is supported rotatably about an axle acting simultaneously as a torsion spring, actuated by a control means for manual actuation at the stamping of a card inserted into the slit, and a locking pawl retaining the frame of the counting mechanism in the non-operative position of the counting mechanism until the control means is actuated to release the locking pawl.

The invention has as its object to render possible control of the distance covered by the vehicle in cases when the vehicle is to be taxed according to the distance covered, in which cases the card after printing at regular time intervals is sent to the motor-car tax authority, which on the basis of its knowledge of the next foregoing reading of the measuring instrument calculates the tax to be charged at the occasion in question. The distance measuring instrument, thus, is to indicate in a continuously accumulating counting mechanism the distance covered, which is obtained by subtraction of the next to last reading from the last reading.

It is of essential importance that a measuring instrument according to the invention must not permit manipulation attempts intending to shorten the distance covered and thereby reduce the tax to be charged.

As the card is to be stamped, there is a possibility of interfering in the counting mechanism via the slit in the measuring instrument in which the card is to be inserted for being stamped. Such interference, for example, may be effected by stopping the counting mechanism by means of a hook or the like inserted into the slit in a certain way. A stamping method, by which the entire stamping operation can be effected from the outside, would directly invite to such undue manipulation. Under such circumstances, it would be possible to press the stamping pad or stamping roll for a shorter or longer period against the wheels of the counting mechanism and thereby stop its normal function. By a normal stamping method, furthermore, the counting mechanism wheels can be in certain positions, in which a printable stamping position cannot be obtained, viz. when one or more wheels of the counting mechanism are in half-positions.

In the previous distance measuring instrument referred to above in the introductory portion, a stamping device for the counting mechanism is so designed, that the counting mechanism while receiving counting impulses is locked in a position remote from the slit, into which the card is to be inserted for stamping. From this locked counting position, the counting mechanism only momentarily can be swung up for performing stamping on the card. The stamping operation is so positively controlled that the stamping spring is to be tensioned to its highest value and thereafter the locking pawl of the counting mechanism is released. Subsequent to stamping, the counting mechanism returns to its locked counting position by action of a return spring. Although the counting mechanism is remote from the slit for the stamping card, and undue interference in the mechanism by inserting a suitable tool into the slit has been rendered difficult to a very high degree, a person who is familiar with the construction may yet effect the counting by wedging the figure wheels or by hooking in the figure feeding device by means of a suitable tool.

OBJECTS AND SUMMARY OF THE INVENTION

The present invention, therefore, has as an object to render such interference in the counting mechanism and its feeding means entirely impossible, in that in the stamping card slit, the opening facing the figure wheels and required for stamping is covered by a curtain, which is positively controlled by the counting mechanism.

The stamping card slit is formed as a pocket entirely closed to the inside of the apparatus, which pocket opens toward the counting mechanism upon release of the stamping operation and is closed immediately upon completion of the stamping operation.

In the previously proposed distance measuring instrument described above in the introductory portion, the control mechanism for a stamping counting mechanism is formed as a handwheel or rotary knob with a threaded portion, which coacts with a non-rotary but axially movable nut. The stamping operation takes place so that the knob is turned, for example, clockwise whereby the axially movable nut starts traveling along the threaded portion of the knob in the direction away from the knob. This movement of the nut is transferred via a straightened elbow joint to one end of a torsion spring, the other end of which is clamped in a pivotal counting mechanism frame supporting the printable figure wheels. As the knob is being turned, the torsion spring is tensioned increasingly and has reached its full tension at the completed stroke of the axially movable nut. In this position of the nut, a locking pawl is so actuated that it ceases to lock the counting mechanism in a locked position of receiving counting impulses. Thus the counting mechanism, driven by the fully tensioned torsion spring, is swung upward and stamps. Immediately prior to the stamping moment, the elbow joint is folded by means of a bar mounted on the counting mechanism frame, and the driving force from the torsion spring is stopped. The counting mechanism continues by kinetic force to the stamping position and thereafter, drawn by a return spring, drops down to its locked position of receiving counting impulses. A new stamping is obtained by first turning the knob counterclockwise, so that the axially movable nut travels toward the knob whereby the elbow joint just folded is again straightened. Then the stamping operation described can be repeated.

For storing in the torsion spring sufficient printing energy, a great force is to be transferred from the knob to the axially movable nut. This applies particularly to the position immediately prior to stamping when the torsion spring is fully tensioned. The torque required on the knob, however, can be held within reasonable limits by choosing a low pitch for the nut and the threaded knob portion. This implies the disadvantage that instead the knob has to be turned many revolutions. An entire stamping cyclus consisting of turning the knob many clockwise revolutions and thereafter as many counterclockwise revolutions, the operation is slow and tiring.

It is, therefore, a further object of the invention to simplify the stamping control mechanism for a card inserted for stamping into the distance measuring instrument. This object is achieved in that instead of the aforesaid handwheel or rotary knob mechanism a push-button device is arranged, by which a push-button is adapted to be pulled out to a position of preparadness and then be depressed for stamping. The main characterizing features of the invention are defined in claim 1, and further characterizing features become evident from the subclaims.

BRIEF DESCRIPTION OF THE DRAWINGS

The invention is described in greater detail in the following, with reference to the embodiments shown in the accompanying drawings, in which.

DETAILED DESCRIPTION OF THE INVENTION

Figure 1:
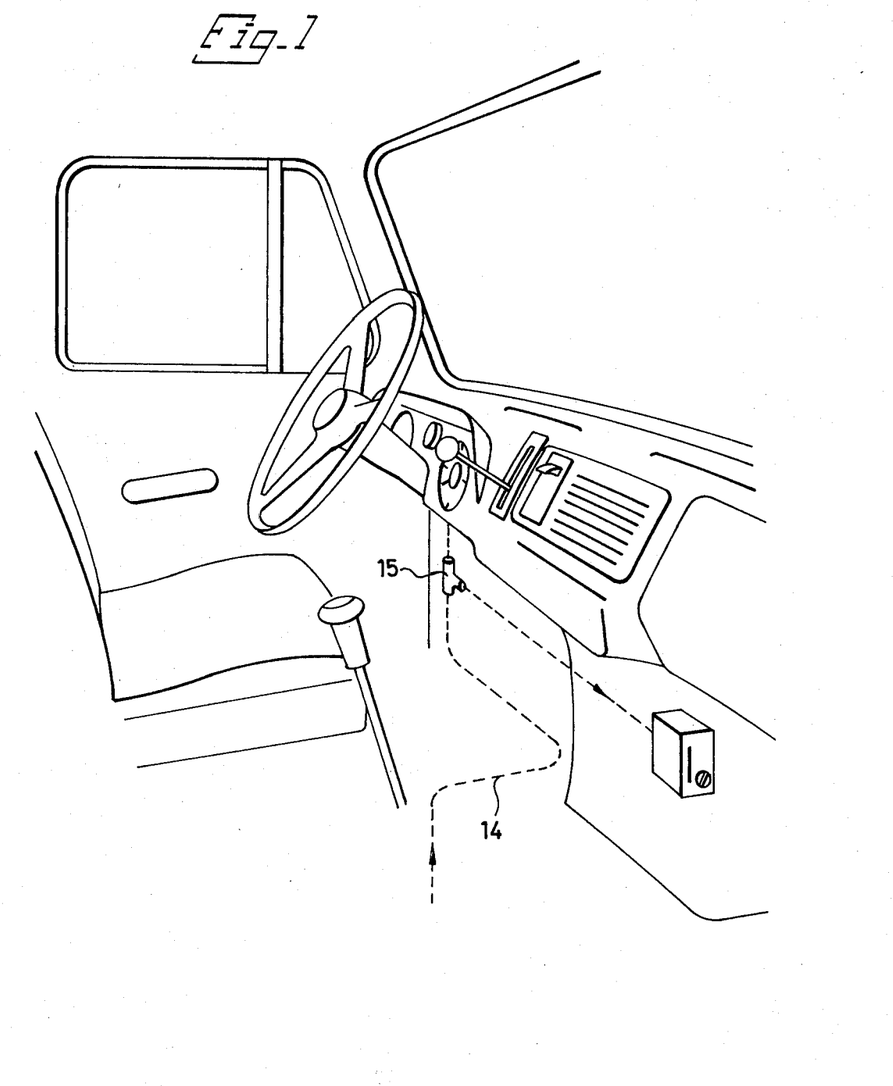
FIG. 1 is a diagrammatic view showing in principle the arrangement according to the invention mounted in a driver's cab of a truck.
Figure 2:
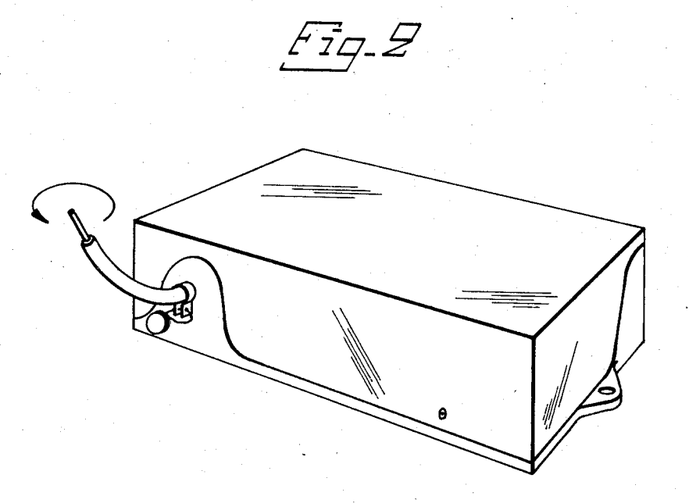
FIG. 2 is an exploded view showing in perspective the distance measuring instrument with a stamping card.

The principle of the arrangement is apparent from FIG. 1, according to which on a wire 14 from the gearbox of the vehicle to its tachometer, a switchbox 15 is mounted, by which the wire is branched off to the counting mechanism built-in in the distance measuring instrument and actuating the same under operation of the vehicle. FIG. 2 shows the distance measuring instrument provided manner, with the slit 16 for insertion of a stamping card 17 and also a control knob 9, by which the card is stamped manually after it has been positioned in the slit and pushed in such a distance that the card surface to be stamped on is located directly in front of the counting mechanism in the operative stamping position of the latter.

Figure 3:
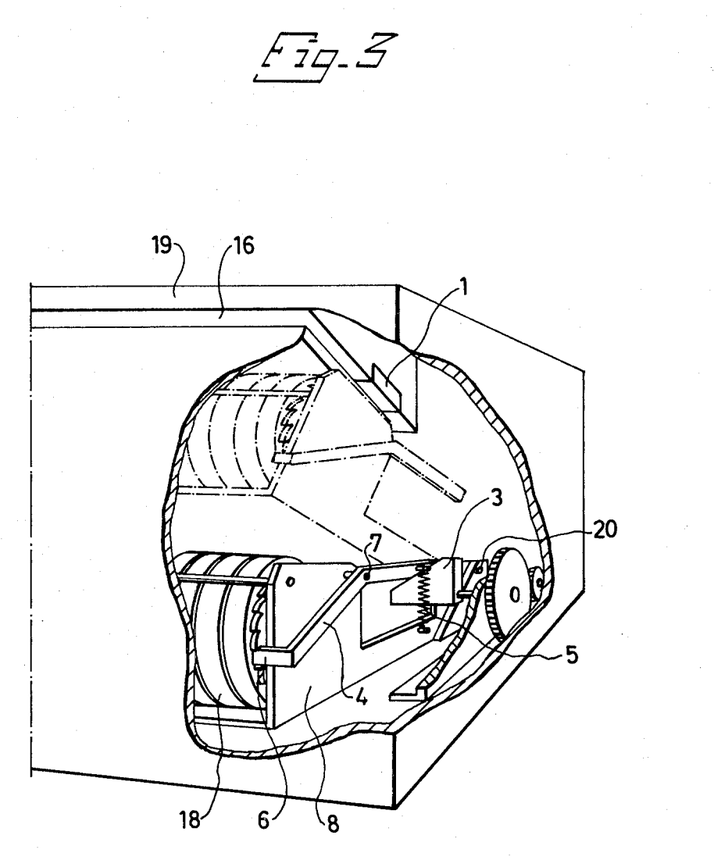
FIG. 3 is a view in perspective showing a previously proposed embodiment of the distance measuring instrument seen from the side, certain parts of the short side being removed, and the non-operative position of the counting mechanism indicated by fully drawn lines and its operative stamping position by dashed lines.

The operation principle of the distance measuring instrument appears in FIG. 3 in which a stamping pad 1 is rigidly mounted on one wall of the slit 16 in a casing 19 and the counting mechanism 18 is freely movable from a non-operative position to an operative stamping position. The non-operative position, the counting mechanism is located remote from the slit, and the counting mechanism wheels are not accessible from outside through the slit by some foreign means. At the stamping operation, the counting mechanism springs forward out of its non-operative position, strikes with the printing types against the stamping card and returns to its non-operative position. The stamping proper is released manually, but the stamping operation proper cannot be influenced from the outside. Figures, which were advanced only half a step in the counting mechanism, are advanced to become printable integral figures, and at the same time the card is stamped. The counting mechanism 18 is arranged in a counting mechanism frame 8 rotatably supported in an axle 20 mounted in the casing 19. The counting mechanism frame 8 is U-shaped in cross-section, as appears more clearly in FIG. 4. On one of the legs is hingedly mounted at 7 in FIG. 3 a rocker arm 4 for advancing the counting mechanism. The rocker arm 4 is actuated at its free end by a helical spring 5, which with its other end is fastened to the counting mechanism frame 8. At its opposite end, the rocker arm 4 is provided with a stop member 6 for advancing the counting mechanism. As the wire from the switchbox 15 runs continuously with the distance covered by the vehicle, it causes a cam disc 3 to rotate continuously. The rocker arm 4 abuts the periphery of the cam disc 3 by pressing action of the spring 5 and is caused by the rotating cam disc 3 to perform an oscillatory movement, which by the stop member 6 again is transformed to a rotary movement. At stamping, the counting mechanism frame 8 is so actuated that the counting mechanism is displaced and the rocker arm loses its contact with the cam disc 3. This implies that the arm 4, by action of the spring 5, rocks toward one end position. As a result thereof, figures advanced only half a step in the counting mechanism are advanced to become integral figures prior to the stamping on the card.

Figure 4:
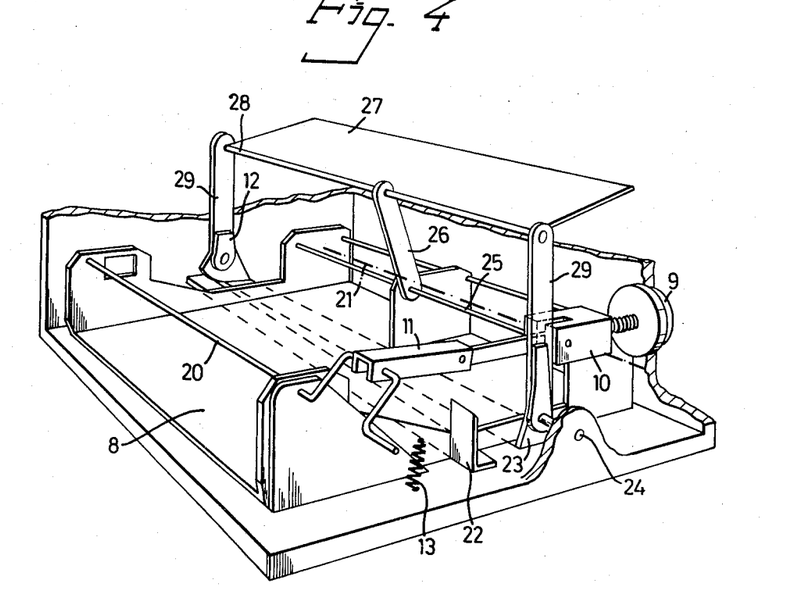
FIG. 4 is a perspective view of an embodiment of the distance measuring device according to the invention, certain outer and inner details being removed.

The counting mechanism 18, as mentioned above, is lifted and stamps the card. The stamping is carried out manually from the outside of the distance measuring instrument by means of the control knob 9 in the form of a control wheel (FIG. 4), which is supported rotatably in the casing 19 and may be designed as a grooved control screw. By turning the wheel 9 manually a number of revolutions in one direction of rotation, a torsion spring is tensioned via an elbow joint 11 then being in a straightened position. The torsion spring forms the axle 20, about which the counting mechanism frame is pivotally mounted. The control wheel 9 actuates a non-rotary nut 10 to move axially in one or the other direction. At the end of the turning of the control wheel 9, a pawl 12 is released which normally holds the counting mechanism in its non-operative position indicated by the fully drawn line in FIG. 3. In FIG. 4, the counting mechanism is removed for reason of improved clarity, but a counting mechanism axle 21 is indicated by a dash line. The nut 10 coacts with a pawl release member 23, which via an axle 24 transfers the control movement to the pawl 12. Upon the release of the pawl 12, the counting mechanism, driven by the tensioned torsion spring 20, pivots upwards against the stamping pad. At the same time as the counting mechanism arrives at the stamping pad 1, the elbow joint 11 is caused to leave its straightened position by action of a bar 22, which is rigidly mounted on the counting mechanism frame 8 and with its free end extends below and past the elbow joint 11. The counting mechanism thereby returns to its non-operative position, by action of a pulling return spring 13, which with one end is fastened to the counting mechanism frame 8 and with its other end to the casing 19.

Before a new stamping operation with the counting mechanism can be carried out, the control wheel 9 is to be turned in the opposed direction to a stop member. Hence the elbow joint 11 is again straightened and the pawl 12 again locks the counting mechanism in its non-operative position. First after these measures have been carried out, a new stamping operation can be performed.

Figure 5:
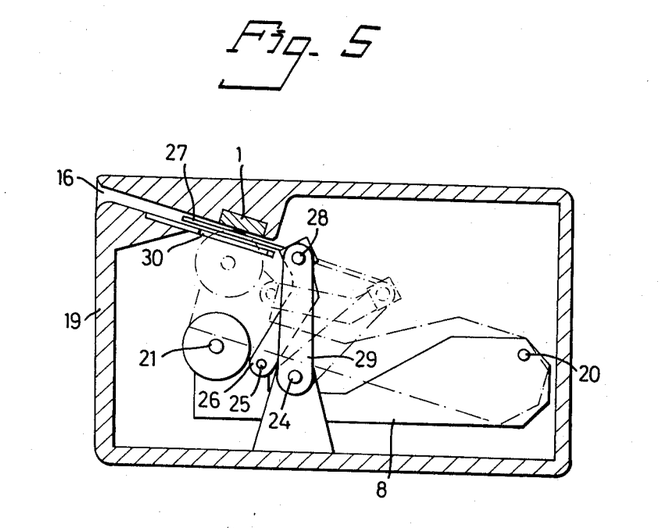
FIG. 5 is a view showing the distance measuring instrument in FIG. 4 seen from the lefthand side in FIG. 4, with the short wall being removed and the curtain indicated in a non-operative position by a fully drawn line and in stamping position by a dash-dot line.

According to the invention, the lower wall of the card insertion slit 16 is provided 30 with an opening (FIG. 5), through which the counting mechanism wheels at stamping strike against the stamping card. A curtain 27 covers said opening 30 in the non-operative position. The object of the curtain 27 is, as mentioned before, to protect the counting mechanism wheels against undue influence from outside. The curtain 27 is rockable about an axle 28, which is mounted on a yoke comprising hinged arms 26 and 29. The two outer hinged arms 29 (FIG. 6) are supported in the casing 19 of the distance measuring instrument and rotatable about an axle 24. The hinged arm 26 is supported at its lower end on an axle 25, which is rigidly connected with the movable counting mechanism frame 8.

Figure 6:
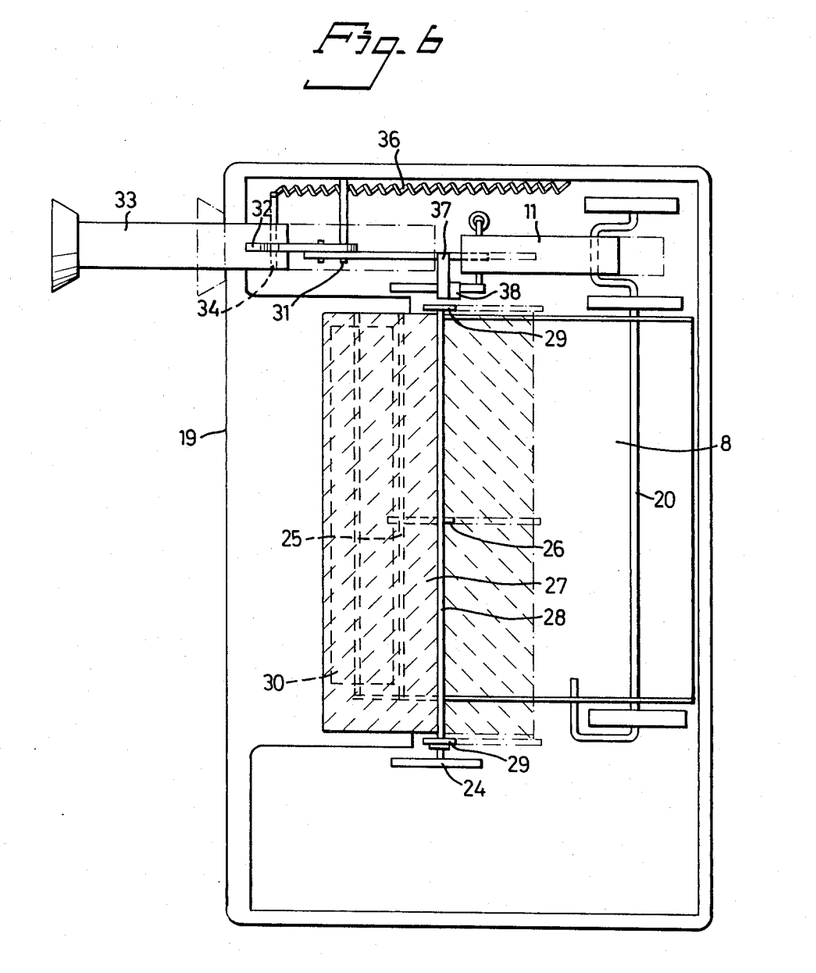
FIG. 6 is a view illustrating a somewhat modified distance measuring instrument seen from above, with the curtain in a non-operative position indicated by lines slanting upward from below from the left to the right, and in stamping position by lines slanting in the opposite direction.

The arrangement operates as follows. When at stamping, the counting mechanism frame 8 pivots upwards about its axle 20, the opening 30 is exposed as the curtain 27, by action of the hinged arms 26 and 29, is swung aside to the position indicated by dash-dot line in FIG. 5. FIG. 6 shows in a clear manner the two different positions of the curtain in a view from above. Subsequent to the stamping of the card inserted in the slit 16, the counting mechanism frame 8, as mentioned above, returns immediately to its non-operative position. Due to the coupling via the hinged arms 26 and 29, the curtain 27 returns at the same time by force to its non-operative position and covers the opening 30 in the card slit 16.

It is apparent that the counting mechanism wheels swing to the design and mode of operation of the curtain 27 are fully protected against undue influence from the outside.

Figure 7:
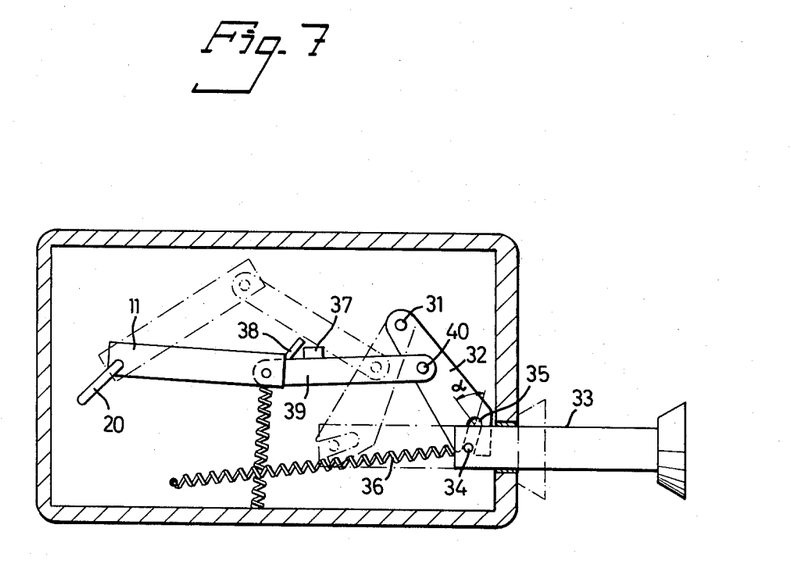
FIG. 7 shows is a view showing the distance measuring instrument according to FIG. 6, with the upper short wall in FIG. 6 being removed, and the different details in position of preparadness indicated by fully drawn lines and in a non-operative position by dash-dot lines.

The distance measuring instrument according to the invention shown in FIGS. 6 and 7 is provided, instead of the control wheel 9 (FIG. 4), with a pushbutton 33 adapted to be pulled out and pushed into the casing of the distance measuring instrument. At the end of the push-button axle located in the casing, a transverse pin 34 is mounted which slides in a groove 35 (FIG. 7) in one end of a lever joint 32. The other end of the lever joint is rockable by an axle 31 rigidly mounted in the casing. At a stud 40 between the ends of the joint 32, a trigger link 39 is rotatably fastened which upwardly is provided with a trigger projection 37 of a laterally inward direction. The other end of the link 39 is rotatable at a tensioning joint 11 for tensioning the torsion spring 20 of the counting mechanism frame 8. A weak spring 36 holds the push-button 33 in the non-operative position against the casing after the stamping is carried out. This position of the mechanism is shown by dash-dot lines in FIG. 7. The trigger projection 37 coacts with a pawl release member 38, which releases the stamping movement of the counting mechanism frame 8.

The arrangement operates as follows. When the stamping operation is desired, the button 33 first is pulled out to the position indicated by fully drawn lines in FIGS. 6 and 7. Thus the elbow joint formed by the joints 11 and 39 is straightened. For actuating the stamping, the button 33 is then moved forcefully inward to the casing whereby stamping action is released in that the trigger 37 actuates the pawl release member, which in turn releases the stamping operation of the counting mechanism frame.

The force required for actuating the button 33 to perform the stamping, i.e. the force required for tensioning the torsion spring 20, is not constant. It increases from the value 0 at the start of the depression when the torsion spring is without tension, to its maximum value at the end of the depression when the torsion spring is fully tensioned and the stamping action is released.

In order to obtain a button force which is approximately constant, the mechanism for controlling the stamping is more precisely designed as follows. The longitudinal direction of the groove 35 forms with the central line of the lever joint 32 an angle $\alpha$. The force of the push-button is transferred to the lever joint 32 by means of the transverse pin 34 slidable in the groove 35. Said transverse pin 34 slides to a greater depth into the groove 35 during the first part of the button movement and thereby the joint 32 is forced to move forward more quickly than the driving transverse pin 34, due to the angular position $\alpha$ of the groove 35. The relation is the opposite one during the later part of the button movement, i.e. the transverse pin 34 slides outwards in the groove 35 and thereby the lever joint 32 is forced to move more slowly than the transverse pin 34. By choosing the value of the angle $\alpha$ suitably related to the length of the push-button path, the turning of the torsion spring and the lengths of the joints, it is possible to obtain a necessary button force which is substantially constant as desired. The invention has been described above with reference to some special embodiments thereof. It is, therefore, understood that the invention can be modified as to its details relative to these embodiments within the scope of the following claims.

I claim:

1. A distance measuring instrument for motor vehicles by which the distance covered by the vehicle is printed by symbols, preferably figures, on a card, comprising a casing having a slit into which a card is insertable, an ink containing means adjacent the slit, an accummulating counting mechanism within the casing, means for moving said counting mechanism from a protected non-operative position remote from the slit to an operating position adjacent the slit for coaction with the ink containing means for stamping the accumulated value on the card inserted in the slit, said means for moving said accumulating counting mechanism comprising a frame, an axle serving simultaneously as a torsion spring about which said frame is rotatably supported, control means for manual actuation of the stamping of the card inserted into the slit, and a locking pawl retaining the frame for the counting mechanism in protected non-operative position until the control means is actuated to release the locking pawl, characterized in that said slit is provided with an opening through which the counting mechanism coacts with the ink containing means during stamping, a curtain covering the opening in the non-operative position of the counting mechanism and means connecting the curtain with the counting mechanism so that the curtain exposes the opening immediately prior to stamping and returns to the position covering the opening immediately after stamping.

2. The distance measuring instrument as defined in claim 1, characterized in that a hinged arm connects the curtain to the counting mechanism frame (8) so as at stamping movement of the latter the opening (30) is exposed and at the return movement of said stamping device covers again said opening (30).

3. The distance measuring instrument as defined in claim 1, characterized in that the control means for releasing the counting mechanism for stamping against an inserted card is a control push-button (33) for actuating an elbow joint mechanism (11,39), said elbow joint mechanism being provided with a trigger member (37) adapted, upon depression of the push-button (33), to actuate a pawl release member (38) for the counting mechanism.

4. The distance measuring instrument as defined in claim 3, characterized in that the push-button (33) at its inner end is provided with a pin (34) adapted to slide in a longitudinal groove (35) in one end of a lever joint (32), which in turn is adapted to straighten said elbow joint mechanism, with said groove (35) forming with the longitudinal axis of the said lever joint an angle ($\alpha$).

5. The distance measuring instrument as defined in claim 3, characterized in that the push-button (33) remains depressed after performed stamping and for a new stamping is to be pulled out to a preparedness position and thereafter be depressed.

6. The distance measuring instrument as defined in claim 1, characterized in that the control means is a wheel, said wheel (9) coacting with a non-rotary but axially movable nut (10), which at turning of the wheel to its end position actuates a pawl release member (23), which via an axle (24) transfers the release force to the pawl (12).

7. The distance measuring instrument as defined in claim 6, characterized in that the torsion spring (20), via an elbow joint (11) being straight at this time, is tensioned at the turning of the wheel (9) by the axial movement of the nut (10) until the pawl (12) releases the counting mechanism frame (8) for striking of the counting mechanism against the card, and that, for returning the counting mechanism to its non-operative position, the elbow joint (11) is caused to leave its straight position by action of a bar (22), which is rigidly mounted on the counting mechanism frame (8) and extends with its free end below and past the elbow joint (11).

8. The distance measuring instrument as defined in claim 7, characterized in that it comprises a pulling helical spring (13) fastened on the counting mechanism frame (8) and, respectively, on the inner wall of the casing (19) and, subsequent to the release of the pawl (12), returning the counting mechanism to its non-operative position.

* * * * *